No. 687,776. Patented Dec. 3, 1901.
R. W. PAIN.
BEARING FOR ROLLS.
(Application filed May 24, 1901.)
(No Model.)
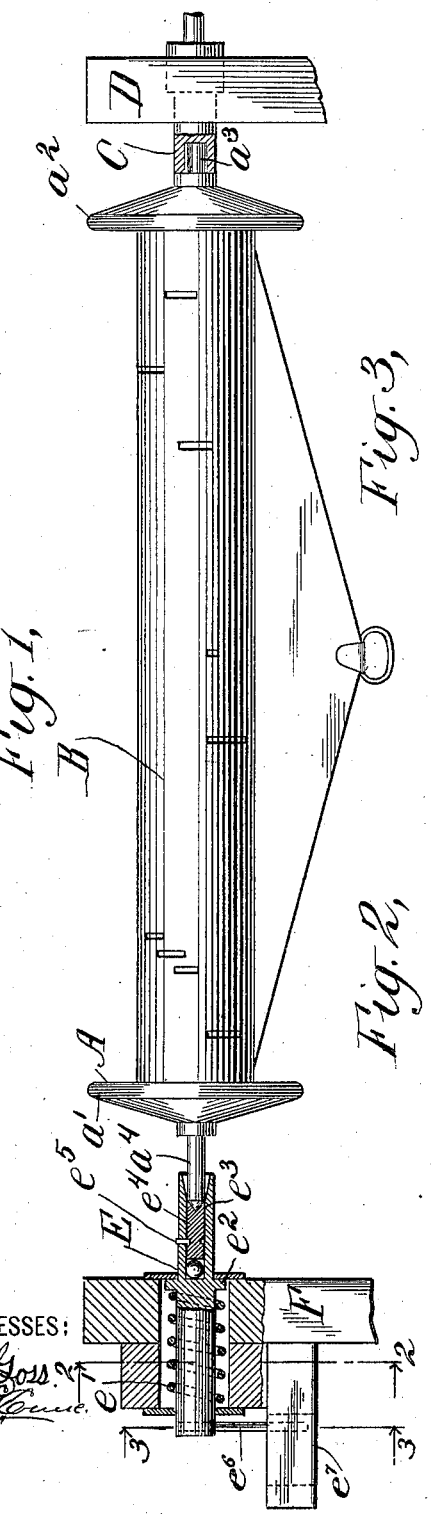
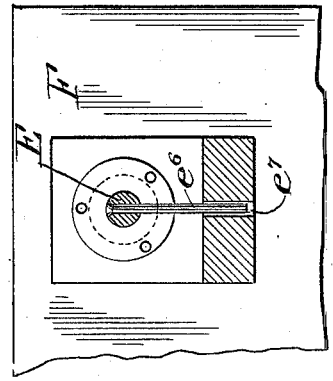
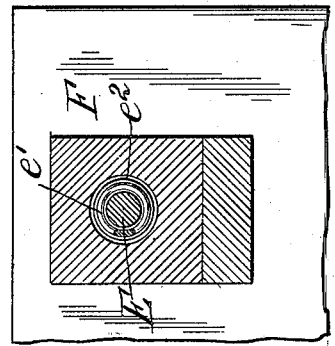
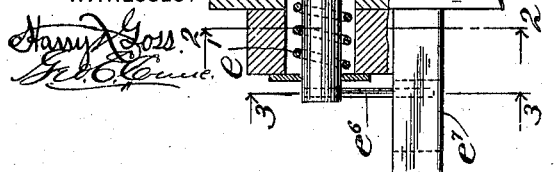
WITNESSES:
INVENTOR
Robert W. Pain.
BY
HIS ATTORNEYS.

UNITED STATES PATENT OFFICE.

ROBERT WILLIARD PAIN, OF NEW YORK, N. Y., ASSIGNOR TO THE AEOLIAN CO., OF NEW YORK, N. Y., A CORPORATION OF CONNECTICUT.

BEARING FOR ROLLS.

SPECIFICATION forming part of Letters Patent No. 687,776, dated December 3, 1901.

Application filed May 24, 1901. Serial No. 61,714. (No model.)

*To all whom it may concern:*

Be it known that I, ROBERT WILLIARD PAIN, of the borough of Manhattan, city, county, and State of New York, have invented a new and useful Improvement in Bearings for Rolls, of which the following is a specification.

My improvement relates to the bearings of music-rolls in mechanical musical instruments. Mechanical musical instruments of a certain class are controlled by perforated music-sheets of paper or other flexible material kept rolled upon music-rolls when not in use and rolled from them onto take-up rolls while in use. The music-rolls are detachable, so that one may be substituted for another to cause the playing of different tunes. One journal of a music-roll is constructed to interlock with a journal formed in the end of a driving-shaft and the other journal of the music-roll is supported in a bearing which is longitudinally adjustable, so that the music-roll may first be engaged with this bearing and this bearing may be pushed longitudinally outward of its normal position to permit of the engagement of the other journal of the music-roll with the bearing formed in the driving-shaft. A spring has been employed for forcing out the longitudinally-movable bearing; and the object of my improvement is to obviate the necessity for rotating this longitudinally-adjustable bearing.

My improvement consists in the combination of a longitudinally-movable piece having a socket at its end, a cylindrical part provided with a bearing for the music-roll journal and arranged within said socket and secured therein so as to be free to rotate, and a ball intermediate of said cylindrical part and the end of said socket, so as to facilitate the turning of the cylindric part.

In the accompanying drawings, Figure 1 is an elevation of a music-roll and appurtenances, illustrating my improvement. Fig. 2 is a transverse section taken at the plane of the dotted line 2, Fig. 1. Fig. 3 is a transverse section taken at the plane of the dotted line 3, Fig. 1.

Similar letters of reference designate corresponding parts in all the figures.

A designates a music-roll of ordinary construction, having wound upon it a music-sheet B and composed of a cylindrical body having flanges $a'$ $a^2$ and journals $a^3$ $a^4$. The journal $a^3$ is provided with a feather or otherwise formed to engage in a socket or bearing formed in the end of a driving-shaft C, the latter being employed for the purpose of rewinding the music-sheet upon the music-roll. This shaft is supported in a standard D. The other journal $a^4$ of the music-roll is cylindrical and is shown as being pointed. It is supported by a bearing made capable of longitudinal movement. As here shown, this bearing consists of a rod E, supported in a standard F and capable of moving longitudinally therein. It is moved outwardly or toward the driving-shaft C by means of a spring $e'$, surrounding it between the standard F and a flange $e^2$, affixed to the rod E. It may be moved longitudinally against the resistance of the spring. This rod is provided with a socket $e^3$ of cylindrical form with a flaring mouth or extremity. Within the cylindrical portion is inserted a cylindrical part $e^4$, which fits so loosely that it may freely rotate. It has a circumferential groove, and a pin $e^5$, inserted in the rod E and intersecting this circumferential groove, holds the cylindrical part in place. A ball is arranged between the inner end of the cylindrical part $e^4$ and the inner end of the socket $e^3$ to facilitate the turning of the cylindrical part $e^4$. The outer extremity of the cylindrical part $e^4$ has a seat for the pointed end of the journal $a^4$. The music-roll has its journal $a^4$ inserted in the bearing E, and then the latter will be pushed longitudinally against the resistance of its spring by pressure applied to the music-roll until it becomes possible to insert the journal $a^3$ of the music-roll into the bearing formed in the end of the driving-shaft C, whereupon the bearing comprising the rod E will be moved outwardly by its spring to support the music-roll in proper position. The cylindrical part $e^4$ will rotate with the music-roll, and it will not be necessary for the rod E to rotate. This is of advantage, as the scratching of the spring from the rotation of the rod E is obviated.

To prevent the rod E from turning, it may advantageously have combined with it some means for securing it to a fixed part of the instrument. As here shown a pin $e^6$ extends diametrically through the rod and into a slot $e^7$ in an appurtenance of the standard F to prevent the rod from turning.

What I claim as new, and desire to secure by Letters Patent, is—

1. In a bearing for rolls, the combination of a longitudinally-movable piece having a socket at its end, a cylindrical part provided with a bearing at one of its ends for the roll-journal, arranged within said socket, and secured against longitudinal movement therein, but so as to rotate, and a ball intermediate of said cylindrical part and the end of the socket, so as to facilitate turning of the cylindrical part.

2. The combination of a longitudinally-movable but non-rotatable piece having a socket at its end, a cylindrical part provided with a bearing for the roll-journal, and arranged within said socket, and secured therein so as to be free to rotate, and a ball intermediate of said cylindrical part and the end of said socket to facilitate turning of the cylindrical part.

3. The combination of a longitudinally-movable piece E having a socket $e^3$ at its end, a cylindrical part $e^4$ provided with a bearing for the roll-journal and having a circumferential groove, a pin carried by the part E which extends into said groove to secure the part $e^4$ in the piece E, and a ball intermediate of said cylindrical part and the end of said socket so as to facilitate turning of the cylindrical part.

4. The combination of a longitudinally-movable piece having a socket at its end, a pressure-spring provided for said piece, a cylindrical part provided with a bearing for the roll-journal, and arranged within said socket, and secured therein so as to be free to rotate, and a ball intermediate of said cylindrical part and the end of said socket so as to facilitate turning of the cylindrical part.

5. The combination of a suitable support, a longitudinally-movable piece having a socket at its end, suitably mounted in said support, means for preventing said piece from rotating consisting of a pin carried by the said piece which extends into a groove provided in an adjacent part of the support and a rotatable bearing secured within said piece for the journal of a roll.

In testimony whereof I have signed my name to this specification in the presence of two subscribing witnesses.

ROBERT WILLIARD PAIN.

Witnesses:
OWEN WARD,
W. CORNELL BENJAMIN.